(12) United States Patent
Zhou et al.

(10) Patent No.: US 7,991,726 B2
(45) Date of Patent: Aug. 2, 2011

(54) INTRUSION DETECTION SYSTEM ALERTS MECHANISM

(75) Inventors: Mian Zhou, Dallas, TX (US); Sean Kenric Catlett, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 836 days.

(21) Appl. No.: 11/948,538

(22) Filed: Nov. 30, 2007

(65) Prior Publication Data

US 2009/0144216 A1   Jun. 4, 2009

(51) Int. Cl.
G06F 17/00 (2006.01)
G06N 5/02 (2006.01)

(52) U.S. Cl. .......................................... 706/47
(58) Field of Classification Search ...................... 706/47
See application file for complete search history.

(56) References Cited

U.S. PATENT DOCUMENTS

| | | | |
|---|---|---|---|
| 7,181,768 B1 | 2/2007 | Ghosh et al. | |
| 7,274,332 B1 * | 9/2007 | Dupray | 342/450 |
| 7,295,831 B2 * | 11/2007 | Coleman et al. | 455/410 |
| 7,525,484 B2 * | 4/2009 | Dupray et al. | 342/450 |
| 7,661,032 B2 * | 2/2010 | Eberbach et al. | 714/38.14 |
| 7,714,778 B2 * | 5/2010 | Dupray | 342/357.31 |
| 7,739,211 B2 * | 6/2010 | Coffman et al. | 706/45 |
| 7,764,231 B1 * | 7/2010 | Karr et al. | 342/457 |
| 7,812,766 B2 * | 10/2010 | Leblanc et al. | 342/457 |
| 7,827,447 B2 * | 11/2010 | Eberbach et al. | 714/45 |
| 7,903,029 B2 * | 3/2011 | Dupray | 342/457 |
| 2002/0161763 A1 | 10/2002 | Ye et al. | |
| 2007/0061882 A1 | 3/2007 | Mukhopadhyay et al. | |
| 2007/0150954 A1 | 6/2007 | Shon | |

OTHER PUBLICATIONS

Testing of detection systems, Leach, G.; Security Technology, 1995. Proceedings. Institute of Electrical and Electronics Engineers 29th Annual 1995 International Carnahan Conference on Digital Object Identifier: 10.1109/CCST.1995.524741 Publication Year: 1995 , pp. 104-109.*
Using Outlier Detection to Reduce False Positives in Intrusion Detection, Fu Xiao; Xie Li; Network and Parallel Computing, 2008. NPC 2008. IFIP International Conference on Digital Object Identifier: 10.1109/NPC.2008.26 Publication Year: 2008 , pp. 26-33.*
ntelligent query in intrusion detection audit system, Fei Gao; Qiang Xue; Ji-Zhou Sun; Machine Learning and Cybernetics, 2003 International Conference on vol. 4 Digital Object Identifier: 10.1109/ICMLC.2003.1259874 Publication Year: 2003 , pp. 2212-2216 vol. 4.*
An Incremental Updating Algorithm for Online Mining Association Rules, Jia Yubo; Duan Yuntao; Wang Yongli; Web Information Systems and Mining, 2009. WISM 2009. International Conference on Digital Object Identifier: 10.1109/WISM 2009.37 Publication Year: 2009 , pp. 144-148.*

* cited by examiner

*Primary Examiner* — Michael Holmes
(74) *Attorney, Agent, or Firm* — Banner & Witcoff, Ltd.; Michael Springs

(57) ABSTRACT

A system and method for analyzing Intrusion Detection System (IDS) alert data associated with a computer network is described. The method includes applying first association rules to obtained IDS alert data associated with a computer network and processing the obtained IDS alert data with the first association rules. Analyst feedback data associated with the processed obtained IDS alert data is received, and a training data set from the analyst feedback data is received. New association rules are determined based upon the training data set, and the new association rules are outputted to a display of a computing device. Outputting the new association rules may include outputting patterns within the IDS alert data of false positive alerts. The new association rules may be applied back to the obtained IDS alert data.

20 Claims, 6 Drawing Sheets

INTRUSION DETECTION SYSTEM ALERTS MECHANISM

BACKGROUND

Generally speaking, an Intrusion Detection System (IDS) is system, which detects unusual and/or hostile activities in a computer network. IDSs detect and/or prevent activities that may compromise system security, and/or an attempted hacking of a component within the network while in progress. IDSs provide a view of unusual activity and issue alerts notifying administrators and/or block a suspected connection altogether.

The false positive rate is a fundamental metric used by the Intrusion Detection System (IDS) industry to measure the performance of an Intrusion Detection System. Under the current state of IDS, it is still difficult for an IDS product to obtain an absolute low false positive rate.

For an entity, there may be a huge amount of security data created by various Intrusion Detection System (IDS)/Intrusion Prevention System (IPS) systems. Analysts may analyze alerts data from the security data for long periods of time, including years. Such alert data may including a large number of false positives.

With a large number of false positives to analyze, true negatives are missed in the analysis. Currently there is no method or system for eliminating the false positive to improve the efficiency of the alerts.

Due to the characters of security alerts data set, the value of variables is more than often categorical rather than numerical, also, alerts may have many different attributes depending on the availability of background knowledge and the type of alert itself. This makes a classical supervised learning method such as a decision tree, a neural network, and RIPPER rule learner difficult to apply. The relevance of each independent variable to the target variable varies with the type of alerts, which make the traditional feature selection difficult. For example, even within a same data set, alerts may have different set of dependent attributes (features) based on the type of alerts, e.g., whether it is an alert on application vulnerability exploit or network scan.

With respect to type of IDS alert, generally, there are 4 outcomes for an alert:

True positive—IDS alert is identified correctly that it is an attack.

True negative—IDS alert is identified correctly that it is not an attack.

False positive—IDS alert is identified incorrectly as a true attack when it is not a true attack.

False negative—IDS alert is identified incorrectly as not an attack when it is a true attack.

Finding an effective method to learn from the history training data, and thus improving the performance of an Intrusion Detection System and analyzing process is needed.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention are directed to a method and system for analyzing Intrusion Detection System (IDS) alert data associated with a computer network is described. The method may include applying first association rules to obtained IDS alert data associated with a computer network and processing the obtained IDS alert data with the first association rules. Analyst feedback data associated with the processed obtained IDS alert data may be received, and a training data set from the analyst feedback data may be received. New association rules may be determined based upon the training data set, and the new association rules are outputted to a display of a computing device.

In accordance with other aspects of the present invention, outputting new association rules may include outputting patterns within the IDS alert data of false positive alerts. Still further, the new association rules may be applied back to the obtained IDS alert data.

In accordance with another aspect of the present invention, another method for analyzing Intrusion Detection System (IDS) alert data associated with a computer network is described. The method may include receiving a training data set with a single target variable and a group of categorical independent variables. For a target variable T, a variable set $V=\{V_1, V_2, \ldots V_n\}$ and a cluster set for variable $V_k = \{C_1, C_2, \ldots C_{j_k}\}$, where $j_k$ is the total number of clusters for variable $V_k$, each variable $V_i$ may be clustered. Selected variables may be received for processing, and a combination depth of 1 may be set. For each cluster $C_k$ of the selected variable $V_i$, each record in the training data set where record $[V_i]=C_k$ and record[target]=T may be checked. A new association rule $C_k \rightarrow T$ and purity is equated to m/n may be generated, where n is the count of records with record $[V_i]=C_k$, and m is the count of records with record $[V_i]=C_k$ and record [target]=T.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
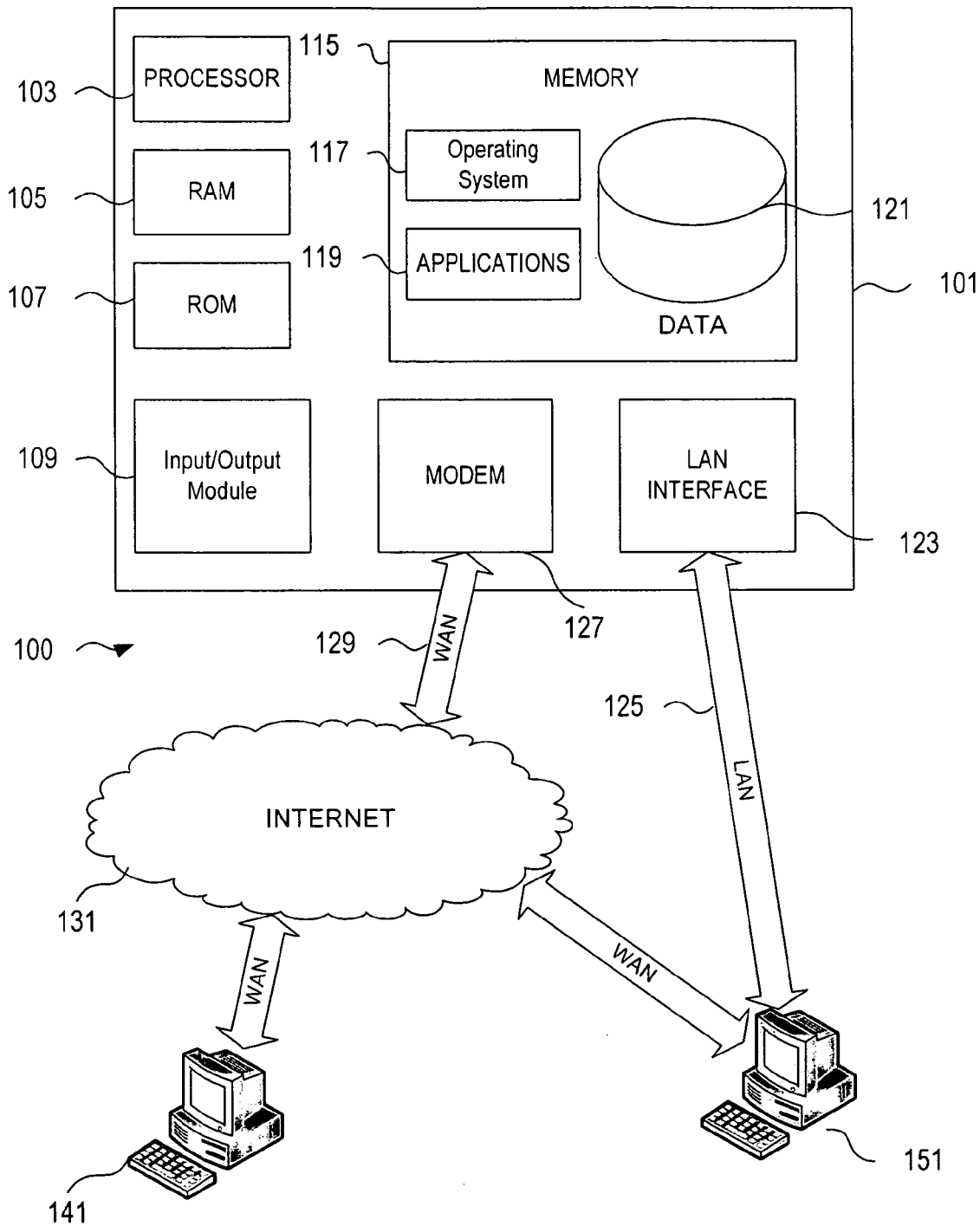
FIG. 1 illustrates a schematic diagram of a general-purpose digital computing environment in which certain aspects of the present invention may be implemented.

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
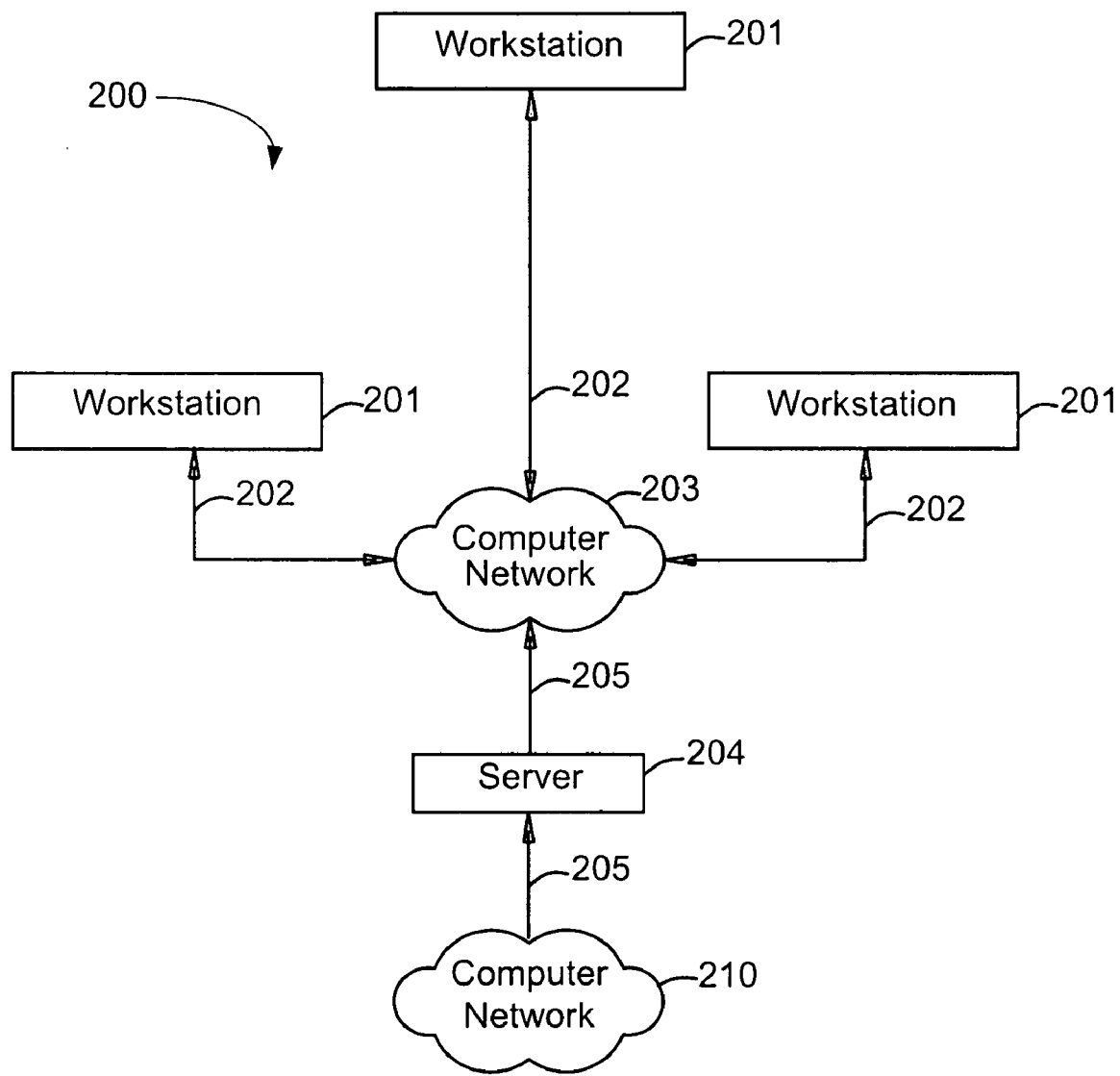
FIG. 2 is an illustrative block diagram of workstations and servers that may be used to implement the processes and functions of certain embodiments of the present invention.

Referring to FIG. 2, an illustrative system 200 for implementing methods according to the present invention is shown. As illustrated, system 200 may include one or more workstations 201. Workstations 201 may be local or remote, and are connected by one or communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

As understood by those skilled in the art, the steps that follow in the Figures may be implemented by one or more of the components in FIGS. 1 and 2 and/or other components, including other computing devices.

Figure 3:
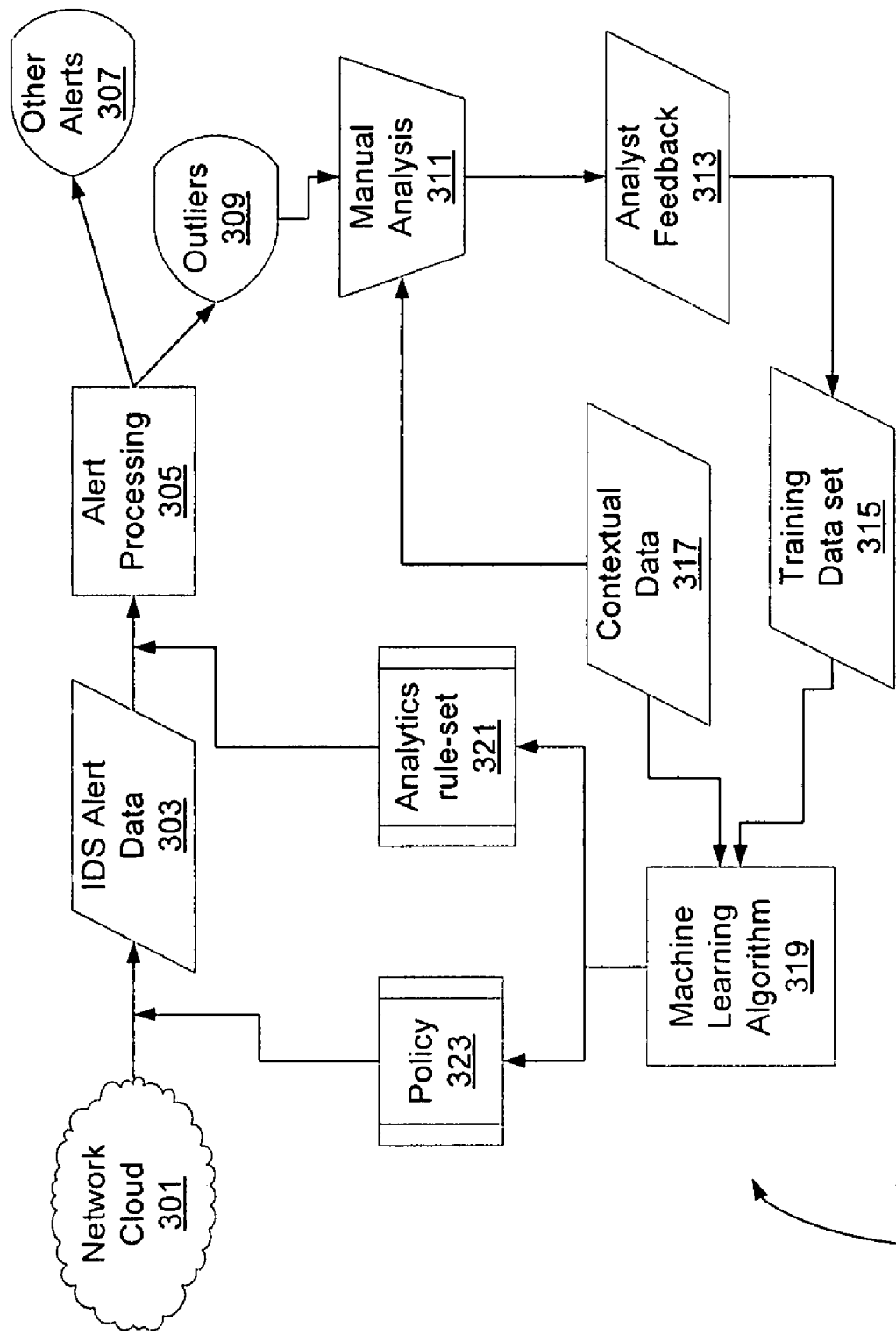
FIG. 3 is an example flowchart of an illustrative method for analyzing Intrusion Detection System (IDS) alerts for identifying and eliminating false positives in accordance with at least one aspect of the present invention.

FIG. 3 is an example flowchart of an illustrative method for analyzing Intrusion Detection System (IDS) alerts for identifying and eliminating false positives in accordance with at least one aspect of the present invention. The centralized machine learning module, which takes analysis feedback in the form of a training data set as input, produces patterns for more efficient alert handling. As shown in FIG. 3, from a network cloud 301, Intrusion Detection System (IDS) alert data is obtained 303. Processing of the IDS alert data occurs in 305 where two outputs may be obtained. Outliers 309 are positive alerts that require further analysis for determining true positives and false positives. The rest of the alerts 307 may not be analyzed further.

Proceeding to step 311, manual analysis on the outliers 309 may be performed. Step 311 may be performed by analysts affiliated with an entity that obtains the IDS alert data or an outside company with analysts to analyze the IDS alert data of the entity. Validation of the outliers occurs as part of the manual analysis 311. Analyst feedback on the manual analysis of the outliers data is obtained in step 313. The feedback data from the analyst may be inserted into a training data set in step 315. In addition, contextual data of a group of categorical independent variables 317 may be inserted into the manual analysis step 311.

Both the contextual data in 317 and the training data set in 315 are utilized in step 319 as part of the machine learning algorithm in accordance with one or more aspects of the present invention. Given a security alerts training data set, the machine learning algorithm tool performs an exhaustive heuristic search in the data set. The tool searches through every possible combination. An output becomes a pattern in the format of associated rules quantified by purity. The purity of each association rule indicates how likely the alert is of being a true positive. A descending sorted list of association rules produces discernable patterns and those patterns demonstrate the confidence of a true positive in descending order.

The output of step 319 may be inserted into step 321 to tweak analytics rule-set associated with processing of the IDS alert data in step 305. The analytics rule-set in 321 is feedback into the process as an input to step 305. In addition, the output of the tool in 319 may be feedback as an input to step 303 as an edit to policy threshold or signature used in obtaining IDS alert data from the network 301. Such feedback allows for more proper processing of security IDS alert data.

Figure 4:
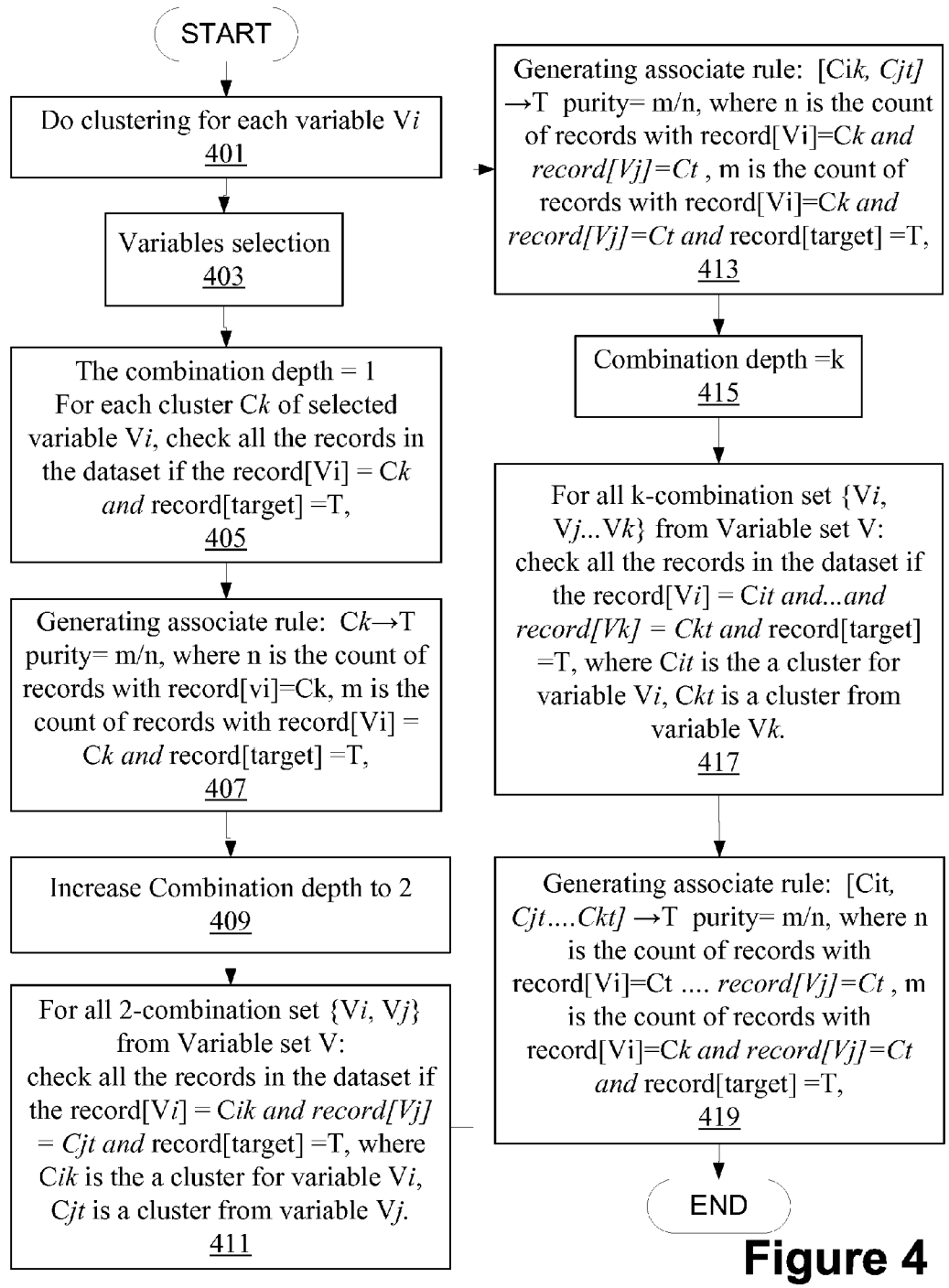
FIG. 4 is an example flowchart of an illustrative method for outputting association rules given a training data set in accordance with at least one aspect of the present invention.

FIG. 4 is an example flowchart of an illustrative method for outputting association rules given a training data set in accordance with at least one aspect of the present invention. With respect to the method shown in FIG. 4, the output includes association rules given a training data set with a single dependent/target variable and a group of categorical independent variables. The output of the association rules may be in the format of {conditionkj, ... }→target value, where j stand for the jth cluster for conditionk. The purity and count of each rule also may be outputted. With respect to the process in FIG. 4, Table 1 is an illustrative format of an IDS alert training data set.

TABLE 1

Illustrative Format of an IDS Alert Training Data Set

| Target | $V_1$ | $V_2$ | $V_3$ | ... |
|---|---|---|---|---|
| 1 | | | | |
| 0 | | | | |
| | | | ? → 1 | |
| | | | ? → 0 | |

After clustering

As should be understood by those skilled in the art, for illustrative purposes, notations for the calculations and processes that follow may correlate to the following. A target variable is T, variable set V is $\{V_1, V_2, \ldots V_n\}$, cluster set for variable $V_k$ is $\{C_1, C_2, \ldots C_{j_k}\}$, where $j_k$ is the total number of clusters for variable $V_k$. The process starts and at step 401, clustering is performed for each variable $V_i$. At step 403, variables selection occurs. Proceeding to step 405, the combination depth is equaled to 1. For each cluster $C_k$ of selected variable $V_i$, all the records in the data set are checked if the record $[V_i]$ equals $C_k$ and the record[target] equals T. At step 407, an associate rule is generated. $C_k \rightarrow T$ and purity is equated to m/n. n is the count of records with record $[V_i]$ equal to $C_k$, and m is the count of records with record $[V_i]$ equal to $C_k$ and record[target] equal to T.

Proceeding to step 409, the combination depth is increased to 2. In step 411, for all two combination set $\{V_i, V_j\}$ from variable set V, all the records in the data set are checked if the record $[V_i]$ equals $C_{i_t}$ and the record$[V_j]$ equals $C_{d_{i\,t}}$ and the record[target] equals T. $C_{i_t}$ is a cluster from variable $V_i$ and $C_{j_t}$ is a cluster from variable $V_j$. At step 413, an associate rule is generated. $[C_{i_t}, C_{j_t}] \rightarrow T$ and purity is equated to m/n. n is the count of records with record $[V_i]$ equal to $C_k$ and record $[V_j]$ equal to $C_t$. m is the count of records with record $[V_i]$ equal to $C_k$ and record $[V_j]$ equal to $C_t$ and record[target] equal to T.

Proceeding to step 415, the combination depth is increased to k. In step 417, for all k combination set $\{V_i, V_j, \ldots V_k\}$ from variable set V, all the records in the data set are checked if the record $[V_i]$ equals $C_{i_t}$ and the record$[V_j]$ equals $C_{j_t}$ and ... and the record $[V_k]$ equals $C_{k_t}$ and the record[target] equals T. $C_{i_t}$ is a cluster from variable $V_i$, $C_{j_t}$ is a cluster from variable $V_j$, ..., and $C_{k_t}$ is a cluster from variable $V_k$. At step 419, an associate rule is generated. $[C_{i_t}, C_{j_t}, \ldots, C_{k_t}] \rightarrow T$ and purity is equated to m/n. n is the count of records with record $[V_i]$ equal to $C_t$ and record $[V_j]$ equal to $C_t$ and ... and record $[V_k]$ equal to $C_t$. m is the count of records with record $[V_i]$ equal to $C_k$ and record $[V_j]$ equal to $C_j$ and ... and record and $[V_k]$ equal to $C_k$ record[target] equal to T.

Given a security alerts training data set labeled with a class label, such as false and true alerts as showed Table 2, or as shown in Table 3, and a group of independent variables, one aspect is to find a correlation between the target variable and the independent variables. The machine learning tool will do an exhaustive heuristic searching/learning in the data set, and output the pattern in the format of association rules quantified by purity, which articulate the connections between like records, which might not be readily apparent to analysts. The purity of each association rule indicates how likely an alert is true positive (false positive) under certain condition(s). As described, the algorithm searches through every possible combination of given set of conditions and outputs the purity of that specific combination. Thus, a descending sorted list of association rules reveals the patterns that lead to true positive or false positive with descending confidence. This greatly enhances the speed with which those trained in the art can distill large data sets and increases their opportunities for discovering false negatives and eliminating false positives. The benefit of using a graphic tool to present these results to knowledgeable security analysts is helpful, since background knowledge is necessary to better interpret the nature of each rule and to tune the IDS policy in time.

TABLE 2

Illustrative IDS Alert Training Dataset with Labeled Class

| sensor | alertName | alertTime | src | dst | srcport | dstport | cou | protocol | rawdata | direc | Conclusion |
|---|---|---|---|---|---|---|---|---|---|---|---|
| rchvaec2 | URL_Data_etc_passwd | 20060801. | 171.159 | 66.179.5.2 | 19545 | 80 | 4 | TCP_HTTP | None | 1 | true |
| rchvaec2 | URL_Data_etc_passwd | 20060801. | 171.159 | 72.5.124.5 | 42254 | 80 | 7 | TCP_HTTP | None | 1 | true |

TABLE 2-continued

Illustrative IDS Alert Training Dataset with Labeled Class

| sensor | alertName | alertTime | src | dst | srcport | dstport | cou | protocol | rawdata | direc | Conclusion |
|---|---|---|---|---|---|---|---|---|---|---|---|
| rchvaec2 | URL_Data_etc_passwd | 20060801. | 171.159 | 72.5.124.1 | 32729 | 80 | 3 | TCP_HTTP | None | 1 | true |
| rchvaec2 | URL_Data_etc_passwd | 20060801. | 171.159 | 216.52.17 | 42392 | 80 | 4 | TCP_HTTP | None | 1 | true |
| rchvaec2 | URL_Data_etc_passwd | 20060801. | 171.159 | 216.52.17 | 59503 | 80 | 2 | TCP_HTTP | None | 1 | true |
| rchvaec2 | URL_Data_etc_passwd | 20060801. | 212.138 | 171.159.1 | 58494 | 80 | 1 | TCP_HTTP | None | 1 | true |
| rchvaec2 | URL_Data_etc_passwd | 20060801. | 212.138 | 171.159.1 | 34735 | 80 | 1 | TCP_HTTP | None | 1 | true |
| rictvea3 | Script_Shell_Command | 20060801. | 216.119 | 171.161.1 | 80 | 51456 | 4 | TCP_HTTP | www.visua | 0 | false |
| clticet4 | Script_Shell_Command | 20060801. | 64.233.1 | 171.161.2 | 80 | 58971 | 4 | TCP_HTTP | _group_mi | 0 | false |

The last column, "Conclusion," in Table 2 indicates whether this alert is a true positive or a false positive and is a target value. All the other information used by analysts, such as "src," "alertName," and "rawdata," are independent variables from which the conclusion is drawn.

TABLE 3

Illustrative IDS Alert Training Dataset with Labeled Class

| alertName | src | dst | d | sensor | time | cou | Inciden | area |
|---|---|---|---|---|---|---|---|---|
| AIX_Pdnsc | 159.184.22 | 171.169.14 | | cltgvia2 | 20060302 | 2 | 8716 | internal |
| ASN1_Con | 159.5.92.1 | 159.5.91.1 | | clthtia4 | 20060407 | 6 | 8785 | internal |
| BackOrific | 171.178.24 | 171.177.11 | | sfocamf1 | 20060104 | 1 | 8561 | unknow |
| ASN1_Con | 159.5.91.1 | 159.5.91.1 | | clthtia4 | 20060407 | 4 | 8786 | internal |
| ASN1_Con | 159.5.91.1 | 159.5.91.1 | | clthtia3 | 20060317 | 2 | 8750 | internal |
| BADIR_23 | 171.159.19 | 171.159.19 | | rchvaec2 | 20061122 | 17 | 9513 | external |
| ASN1_Con | 159.5.91.1 | 159.5.91.1 | | clthtia4 | 20060327 | 14 | 8765 | internal |
| ASN1_Con | 159.5.91.1 | 159.5.91.1 | | clthtia3 | 20060322 | 2 | 8759 | internal |
| BADIR_10 | 171.159.19 | 171.159.19 | | rchvaeb1 | 20061125 | 15 | 9525 | external |

| alertName | analystID | Status | . | _closeTime | closeBy | _conclusion |
|---|---|---|---|---|---|---|
| AIX_Pdnsc | nbasz3w | Closed | | _Thu_Mar_02_18: | NBKGX35 | _IDS_Testing |
| ASN1_Con | nba53ix | Closed | | _Wed_Apr_12_18 | NBA39QP | _False_positive |
| BackOrific | nbkgx35 | Closed | | _Fri_Jan_06_21:4 | NBKKPM6 | _False_positive |
| ASN1_Con | nbtz15g | Closed | | _Wed_Apro_12_1 | NBA39QP | _False_positive |
| ASN1_Con | nba69aj | Closed | | _Thu_Mar_23_19: | NBKCY5U | _Application_ex |
| BADIR_23 | sec0344 | Closed | | Thu_Dec_07_16: | nbawz2e | _False_positive |
| ASN1_Con | nbam7mq | Closed | | _Fri_Mar_31_16:1 | NBA69AJ | _False_positive |
| ASN1_Con | nba69aj | Closed | | _Thu_Mar_23_21: | NBKCY5U | _False_positive |
| BADIR_10 | nba4ipm | Closed | | _Mon_Nov_27_16 | None | _Reconnaissan |

In one application, a user may use any variables as a target value as long as she wants to discovery how the other variables correlate with it. She may put the target variable as the last column in the data file. For example, if "conclusion" is chosen to be target variables, such as a current target value is "Application exploit", "dst," "src," and "alertName" may be chosen to be independent variables. Therefore, a user may want to know "what kind of alert from where to where always or most of time leads to an 'application exploit' alert." Alternatively, if the user chooses "src" as a target value and "alertName" and "time" as independent variables, the user may want to know "what type of alerts, at what time would always come from that src."

Figure 5:
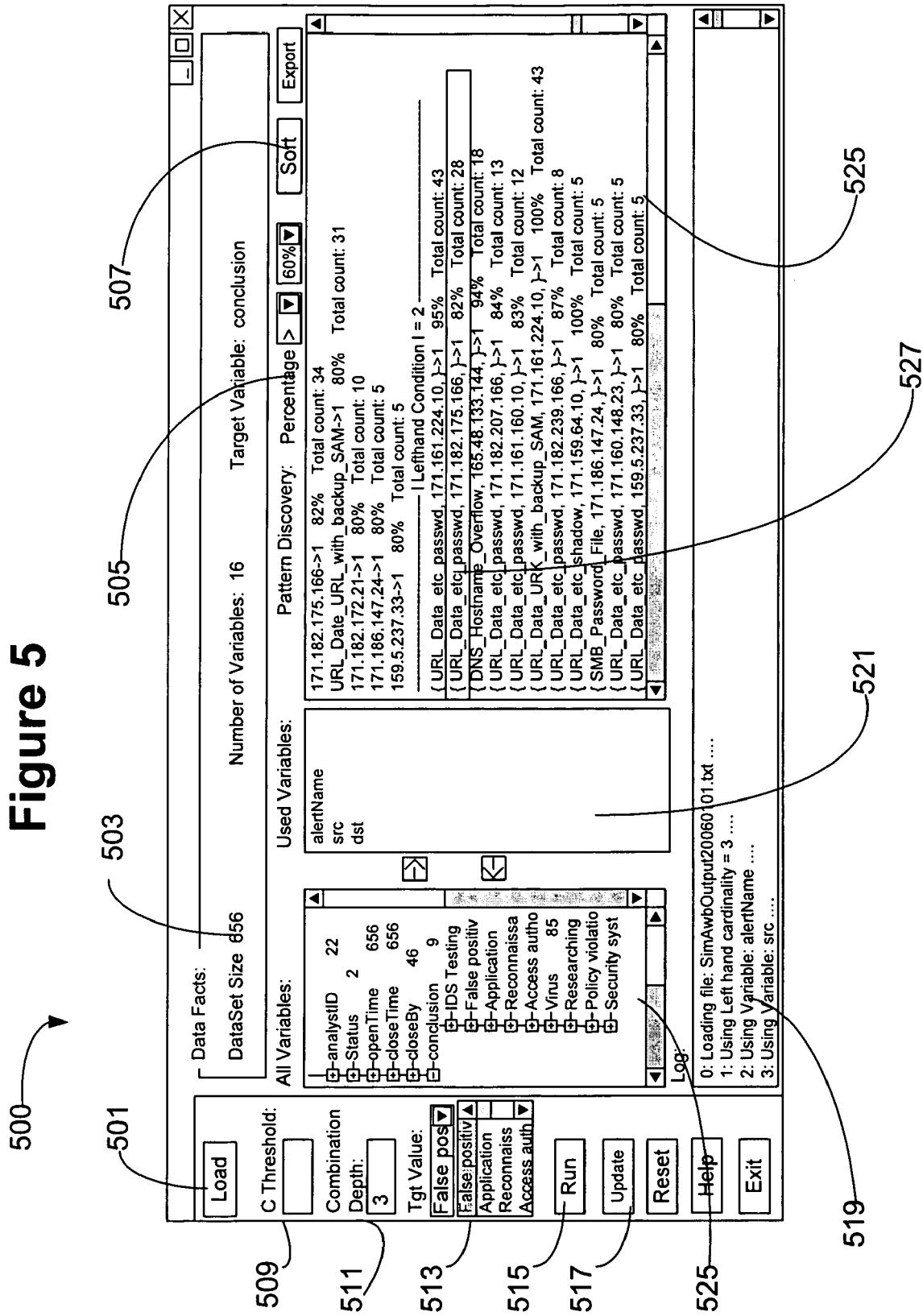
FIG. 5 is an example user interface displaying an output to a user in accordance with one or more aspects of the present invention.

FIG. 5 is an example user interface displaying an output to a user in accordance with one or more aspects of the present invention. FIG. 5 shows a snapshot 500 of the algorithm output. The tool provides users a flexible way to change the configuration and the format of the output data. In accordance with a tool, such as a computer implemented program shown in FIG. 5, patterns from security data sets may be used to reduce false positives.

In this illustrative example, load button 501 may be an interface to load data for processing in accordance with one or more aspects of the present disclosure. Reference element 509 is the cluster threshold used to choose variables for processing. The cluster threshold input may be an option for a user. In one example, the cluster threshold may correlate to step 403 from FIG. 4. With respect to reference element 511, the combination depth, i.e., the cardinality of left hand set used in pattern searching, for processing of the clusters may be set. The combination depth is a criteria used by heuristic algorithm in deciding the recursive function depth. In one example, this reference element 511 may correlate to steps 405, 409, and/or 415 from FIG. 4. With respect to reference element 513, the target value used in the pattern may be set here. In one example, a target value of 0 may correlate to false positive and a target value of 1 may correlate to true positive.

Basic data set information, such as the data set size, number of variables, and target variable, may be shown in data field area 503. Reference element 515 may be selected to run the processing after completing load and initial set up. Reference element 517 may be a button to update the input parameters so that when the "Run" button 517 is selected, new result are outputted. During and after processing, a run time log data field 519 may be shown. Reference element 525 shows a data field of clustering features for all variables used in the data set. In this illustrative example, "conclusion 9" may indicate that there are nine categories under variable "conclusion," "IDS Testing," "False positive," "Application," "Reconnaissance," "Access auth," "Virus," "Researching," "Policy violation," and "Security system."

Reference element 521 shows a data field of currently selected variables that are used for pattern searching. In the illustrative example provided, the currently selected variables may be specified by "alertName" or may be selected by a user, such as an analyst, with an input device activating a cursor on a computing device. The selected variables in data field 521 may be selected independent variables by a user. Reference element 505 shows that data field 523 displays patterns with a percentage in excess of 60%. As should be understood by those skilled in the art, other percentages than 60% may be utilized and the present disclosure is not so limited to the examples provided herein.

Reference element 523 displays an output window of patterns of the security data that meet the greater than 60% setting. Within output window 523, patterns may be found in the format of {variable1, variable2 ... } Target (0/1), percentage, and total count. For example, the output shown as reference element 527 indicates that for all 28, the total count shown, URL_Data_etc_passwd alerts, e.g., the "alertName," from "src" "171.161.224.166," 82% of them are false positives, since a "1" means an index value of the target value being false positives. Thus, the alerts "URL_Data_etc_passwd" comes from "171.161.224.166" are 82% lead to a false positive alert and the total appearance of it is 28. That is, 82% of all those 28 cases are false positive alerts.

Reference element 507 illustrates a two-way sort button to sort the pattern window 523 based on percentage or percentage and total count. As should be understood by those skilled in the art, any of a number of different output sorting methods may be utilized as needed or desired and the present disclosure is not so limited to the examples provided herein. As such, these patterns from the surety data sets assist in reducing the number of false positives identified in the security data.

Figure 6:
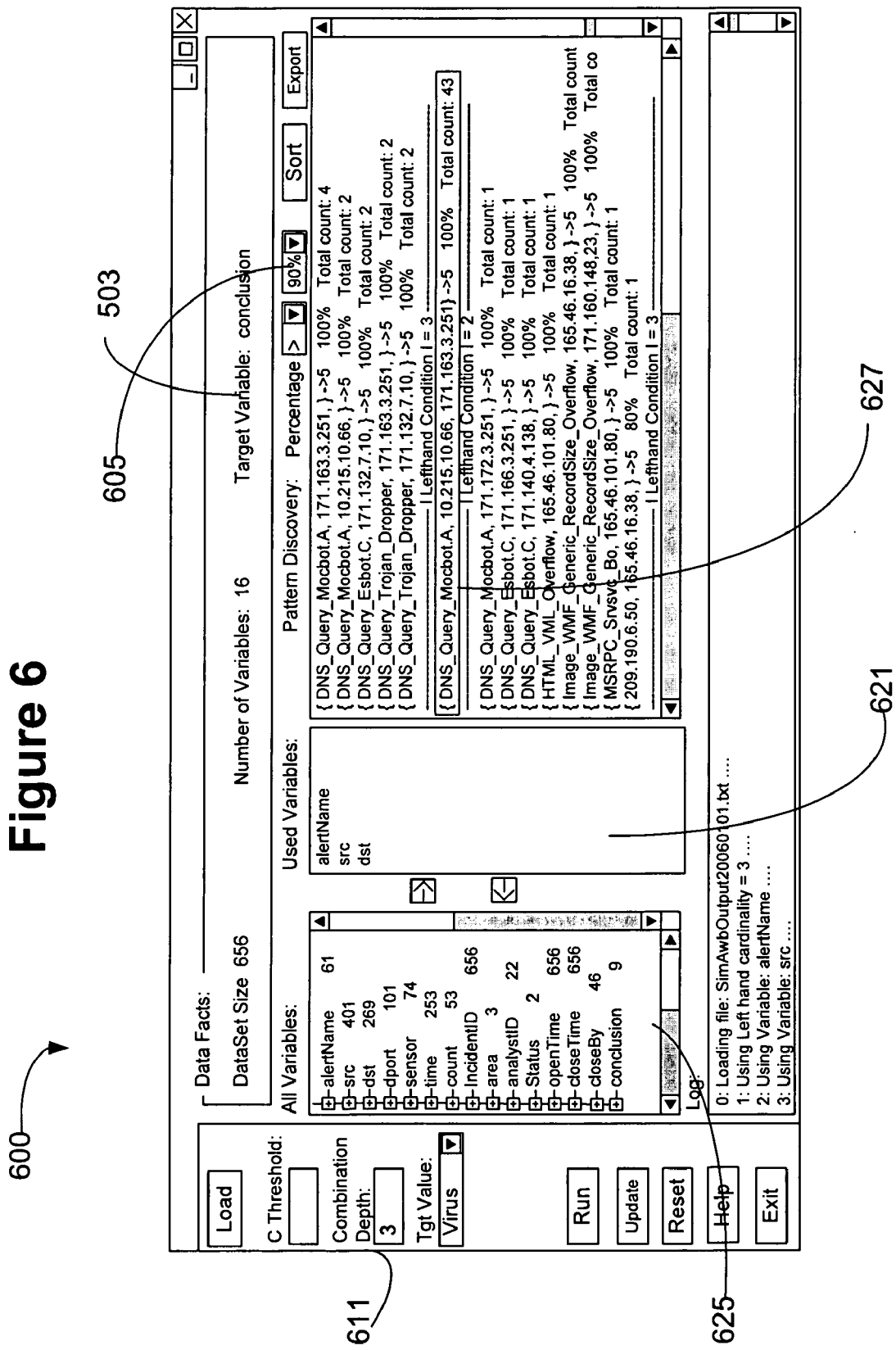
FIG. 6 is another example user interface displaying an output to a user in accordance with one or more aspects of the present invention.

FIG. 6 is another example user interface displaying an output to a user in accordance with one or more aspects of the present invention. FIG. 6 shows a snapshot 600 of the algorithm output. In this example, the target variable 603 is "conclusion." The available independent variables are "alertName," "src," "dst," "dport," ... and "closeBy," as shown in data field 625. The chosen independent variables are "alertName," "dst," and "src," as shown in data field 621. Combination depth 611 indicates to use up to all of the three chosen independent variables when looking for correlation. Thus, the independent variable set used to generate the pattern is (alertName), (dst), (src), (alertName, dst), (alertName, src), (src, dst), and (alertName, src, dst). The purity percentage 605 indicates that only the association pattern with correlation greater than 90% will be shown as a result. The output is all the association patterns with purity >90% and sorted in descending order based on purity. Thus, the output shown as reference element 627 indicates that for all 5, the total count shown, DNS_Query_Machot.A, e.g., the "alertName," from "src" "10.215.10.166," to "dst" "171.163.3.251," 100% of them triggered a virus alert, since a "5" means an index value of the target value being virus. Thus, the alerts "DNS_Query_Machot.A" from "10.215.10.166" to "171.163.3.251" are 100% lead to a virus alert and the total appearance of it is 5. That is, 100% of all those 5 cases are virus alerts.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. Aspects of the present disclosure may be used as a standard application programming interface (API) to apply it on various security data. It will also be appreciated and understood that modifications may be made without departing from the true spirit and scope of the present invention. The description is thus to be regarded as illustrative instead of restrictive on the present invention.

We claim:

1. A method for analyzing Intrusion Detection System (IDS) alert data associated with a computer network, the method comprising:
applying first association rules to obtained IDS alert data associated with a computer network;
processing the obtained IDS alert data with the first association rules;
receiving analyst feedback data associated with the processed obtained IDS alert data;
receiving a training data set from the analyst feedback data;
determining new association rules based upon the training data set; and
outputting the new association rules to a display of a computing device.

2. The method of claim 1, further comprising obtaining the IDS alert data associated with the computer network.

3. The method of claim 1, further comprising applying the new association rules back to the obtained IDS alert data.

4. The method of claim 1, further comprising receiving a group of categorical independent variables, wherein the determining new association rules is further based upon the group of categorical independent variables.

5. The method of claim 1, wherein the outputting the new association rules includes outputting patterns within the IDS alert data of false positive alerts.

6. The method of claim 5, wherein the outputting patterns includes providing a percentage of false positives.

7. The method of claim 5, further comprising receiving selected variables for the determining new association rules.

8. The method of claim 1, further comprising setting a combination depth for the determining new association rules.

9. A method for analyzing Intrusion Detection System (IDS) alert data associated with a computer network, the method comprising:
receiving a training data set with a single target variable and a group of categorical independent variables;
for a target variable T, a variable set $V=\{V_1, V_2, \ldots V_n\}$ and a cluster set for variable $V_k=\{C_1, C_2, \ldots C_{j_k}\}$, where $j_k$ is the total number of clusters for variable $V_k$, clustering each variable $V_i$;
receiving selected variables for processing;
setting a combination depth of 1;
for each cluster $C_k$ of the selected variable $V_i$, checking each record in the training data set where record$[V_i]=C_k$ and record[target]=T;
generating a new association rule $C_k \rightarrow T$ and purity is equated to m/n, wherein n is the count of records with record $[V_i]=C_k$, and m is the count of records with record $[V_i]=C_k$ and record[target]=T; and
outputting the new association rule to a display of a computing device.

10. The method of claim 9, further comprising increasing the combination depth by 1.

11. The method of claim 10, further comprising:
for each two combination set $\{V_i, V_j\}$ of the selected variable set V, checking each record in the training data set where record $[V_i]=C_{i_k}$, record$[V_j]=C_{j_t}$, and record[target]=T, where $C_{i_k}$ is a cluster from variable $V_i$ and $C_{j_t}$ is a cluster from variable $V_j$;

generating a new association rule $[C_{i_k}, C_{j_r}] \rightarrow T$ and purity is equated to m/n, wherein n is the count of records with record $[V_i]=C_k$ and record $[V_j]=C_r$, and m is the count of records with record $[V_i]=C_k$, record $[V_j]=C_r$, and record [target]=T.

12. The method of claim 11, further comprising increasing the combination depth to k, where k is greater than 2.

13. One or more computer readable media storing computer executable instructions that, when executed by at least one processor, cause the at least one processor to perform a method comprising:
   applying first association rules to obtained IDS alert data associated with a computer network;
   processing the obtained IDS alert data with the first association rules;
   receiving analyst feedback data associated with the processed obtained IDS alert data;
   receiving a training data set from the analyst feedback data;
   determining new association rules based upon the training data set; and
   outputting the new association rules to a display of a computing device.

14. The one or more computer readable media of claim 13, the method further comprising applying the new association rules back to the obtained IDS alert data.

15. The one or more computer readable media of claim 13, the method further comprising receiving a group of categorical independent variables, wherein the determining new association rules is further based upon the group of categorical independent variables.

16. The one or more computer readable media of claim 13, wherein the outputting the new association rules includes outputting patterns within the IDS alert data of false positive alerts,
   wherein the outputting patterns includes providing a percentage of false positives.

17. The one or more computer readable media of claim 13, the method further comprising receiving a setting for a combination depth for the determining new association rules.

18. A system comprising:
   at least one database configured to maintain first association rules and new association rules;
   at least one computing device, operatively connected to the at least one database, configured to:
      apply the first association rules to obtained IDS alert data associated with a computer network;
      process the obtained IDS alert data with the first association rules;
      receive analyst feedback data associated with the processed obtained IDS alert data;
      receive a training data set from the analyst feedback data;
      determine the new association rules based upon the training data set; and
      output the new association rules to a display of a computing device.

19. The system of claim 18, the at least one computing device further configured to apply the new association rules back to the obtained IDS alert data.

20. The system of claim 18,
   wherein the output the new association rules includes being configured to output patterns within the IDS alert data of false positive alerts,
   wherein the output patterns includes being configured to output a percentage of false positives.

* * * * *